US012692400B2

(12) United States Patent (10) Patent No.: US 12,692,400 B2
Frankel et al. (45) Date of Patent: Jul. 28, 2026

(54) COMPOSITIONS AND METHODS FOR MAKING INSTANT-SET AQUEOUS COATINGS

(71) Applicant: Rohm and Haas Company, Collegeville, PA (US)

(72) Inventors: Erica A Frankel, Audubon, PA (US); David M. Conner, Dresher, PA (US); Farhan Ansari, Norristown, PA (US)

(73) Assignee: ROHM AND HAAS COMPANY, Collegeville, PA (US)

(\*) Notice: Subject to any disclaimer, the term of this patent is extended or adjusted under 35 U.S.C. 154(b) by 9 days.

(21) Appl. No.: 18/685,696

(22) PCT Filed: Sep. 27, 2022

(86) PCT No.: PCT/US2022/044786
§ 371 (c)(1),
(2) Date: Feb. 22, 2024

(87) PCT Pub. No.: WO2023/055697
PCT Pub. Date: Apr. 6, 2023

(65) Prior Publication Data
US 2024/0352259 A1 Oct. 24, 2024

Related U.S. Application Data

(60) Provisional application No. 63/250,559, filed on Sep. 30, 2021.

(51) Int. Cl.
C09D 5/02 (2006.01)
C09D 7/61 (2018.01)
(Continued)

(52) U.S. Cl.
CPC ............... C09D 5/024 (2013.01); C09D 7/61 (2018.01); C09D 7/65 (2018.01); C09D 133/08 (2013.01)

(58) Field of Classification Search
CPC . C09D 5/024; C09D 7/61; C09D 7/65; C09D 133/08; C09D 133/064; C09D 133/26; C08F 220/1804; C08K 3/16
See application file for complete search history.

(56) References Cited

U.S. PATENT DOCUMENTS 4,571,415 A    2/1986   Jordan, Jr.
5,219,914 A    6/1993   Warburton, Jr.
(Continued)

FOREIGN PATENT DOCUMENTS

CN          109355017        2/2019

OTHER PUBLICATIONS

Technical Datasheet of Butyl Acrylate by Grantrade (Year: 2025).\*
PCT/US2022/044786, International Search Report and Written Opinion with a mailing date of Feb. 1, 2023.

*Primary Examiner* — Joseph S Del Sole
*Assistant Examiner* — Olga Lucia Donahue

(57) ABSTRACT

The present invention provides two-component instant-set aqueous coating compositions that provide coating films having good film quality despite a rapid film build and set. The compositions comprise, as Component I, a film-forming aqueous anionically stabilized polymer composition, such as an elastomeric acrylic or vinyl polymer, and one or more surfactants; and, as Component II, a polycation tolerant mixture of polycation, an aqueous polymer composition, such as a film-forming acrylic emulsion polymer, and a nonionic or ethoxylated anionic surfactant having an average of 7 or more or, preferably, 9 or more ethylene oxide groups per molecule. Component I can be an elastomeric roof coating composition. The compositions can be co-sprayed to form coatings, e.g. roof coatings.

11 Claims, 2 Drawing Sheets

(51) Int. Cl.
    *C09D 7/65*         (2018.01)
    *C09D 133/08*     (2006.01)

(56)          References Cited

U.S. PATENT DOCUMENTS

| | | | |
|---|---|---|---|
| 5,403,393 | A | 4/1995 | Dubble |
| 5,985,366 | A | 11/1999 | Wright |
| 6,013,721 | A | 1/2000 | Schall et al. |
| 7,166,667 | B2 | 1/2007 | Bakule |
| 2009/0176127 | A1 * | 7/2009 | Matthews .............. C09D 15/00 |
| | | | 523/172 |
| 2017/0037263 | A1 | 2/2017 | Iyer et al. |
| 2018/0327624 | A1 | 11/2018 | Mallardi et al. |

* cited by examiner

COMPOSITIONS AND METHODS FOR MAKING INSTANT-SET AQUEOUS COATINGS

FIELD

The present invention relates to two-component instant-set aqueous coating compositions comprising as one component (Component I) an aqueous anionically stabilized polymer composition and, in a separate polycation tolerant component that sets the anionically stabilized stabilized polymer (Component II), a polycation and an aqueous polymer composition. More particularly, the present invention relates to two-component aqueous coating compositions comprising, as Component I, a film-forming aqueous anionically stabilized polymer composition, and, as a polycation tolerant Component II, a polycation and an aqueous polymer composition, such as an emulsion polymer, wherein the aqueous polymer composition is stabilized with a nonionic surfactant, a polyethoxylated anionic surfactant, or a mixture of two or more thereof.

INTRODUCTION

Rapid or instant setting of exterior coatings can provide several advantages over typical ambient-cured films. Aqueous exterior coatings are vulnerable to wash-out immediately following application, i.e. prior to drying or curing. Moreover, because labor is increasingly costly and the rate limiting step in making a coating is the time required to dry each applied layer of a coating composition, it has become increasingly desirable to avoid spending several days on a job comprising applying multiple coats. Accordingly, coating manufacturers have provided solutions for instant-set coatings that comprise multiple (usually) component coatings solutions, such as, for example, dual spray streams. Further, known instant-set coatings have enabled a one coat application of a very thick film; and this is an advantage over conventional coatings where the thick films tend towards excessive dry time and have a tendency to result in mud cracking. Mud cracking occurs when a coating surface dries preferentially and ultimately results in cracks and film defects as the remaining film dries. However, known instant-set coatings suffer because the setting agents in them are corrosive to spray equipment even when they are used at a low volume solids (<20% v/v) content. As a result, such instant-set coatings may severely inhibit coating dry film properties such as tensile strength and elongation, and water swelling or the weight percent increase in an applied coating after a water soak of the coating.

In one example of a known two-component, instant-set coating solution, one component contains an aqueous pigmented composition of an anionic emulsion polymer and a second component contains a flocculating agent as a setting agent, for example, a polycationic polymer or inorganic multivalent metal salt. Such instant-set coatings allow for a rapid film build to form thick films. However, the water in the film is trapped as it sets, leading to void spaces. Another factor which causes voids, gaps, or defects in multiple component instant set films is the speed at which the coating material in the film reacts. Such films tend to coagulate into large droplet particles, leaving the film with a high porosity. The existence of such porosity can be shown via use of an optical microscope or by visually inspecting the surface of the film for a highly irregular as opposed to smooth surface. The high porosity also decreases both the mechanical strength and the water resistance of the coating as shown by water swelling resistance testing as determined in accordance with ASTM D6083 D471.

Recently, US 2017/0037263A1, to Iyer et al., has disclosed two-part aqueous coating composition wherein the two parts are co-applied to form a rapid set coating. The first part or first component comprises a coating composition containing one or more polymers, such as emulsion polymers, for example, emulsion polymers derived from an acid monomer. The second part or component can comprise a flocculant, such as a multivalent metal salt, for example, a calcium salt, which is used in an effective amount such that contacting or co-spraying the two components results in a rapid setting coating when the two components are applied to a surface, such as a roof. The results obtained using the Iyer two-component coating and method provide nearly instantaneous flocculation to form droplets on a substrate. However, the rate of setting or film forming does not allow the droplets to distribute uniformly, thereby resulting in numerous film defects such as voids. In a spray application, the flocculant spray drops also leave void spaces as the coating droplets coagulate around it. The resulting coating film is substantially more porous, has substantially weaker mechanical strength, and substantially higher water absorption than a coating made from just the same first component.

The present inventors have endeavored to provide instant-set coating compositions and methods to apply them to make coatings that exhibit a lower vulnerability to wash-out immediately following application, reduced defects, such as voids, and an acceptable porosity in the resulting coating film.

SUMMARY

In accordance with the present invention, two-component instant-set aqueous coating compositions comprise:
 a Component I comprising:
 a film-forming aqueous anionically stabilized polymer composition of a polymer having one or more acid functional groups, preferably, carboxyl or ammonium carboxylate groups; and, further comprising, one or more surfactants in a total amount of from 0.04 to 3 wt. % or, preferably, from 0.2 to 2.0 wt. %, based on the total weight of Component I; and,
a polycation tolerant Component II, for example, that (i) does not separate, precipitate out or produce a visible sediment when left to stand on a shelf at from 20 to 25° C. and at atmospheric pressure for 2 or more days (48 hours) or, preferably, for 7 days (168 hours) or longer, and, further, that (ii) is shear tolerant flows and is free of grit or coagulation after mixing with a polycation slurry, as determined by adding 200 g of the Component II composition, along with 5 drops of a defoamer of a polysiloxane in polyglycol, to a slurry prepared with a bench top mixer and consisting of 200 g of BaSO$_4$ powder and 50 g of water contained in a 10 cm diameter, 1 L metal grind pot and then homogenizing the resulting Component II-slurry mixture mixing using a 5.5 cm diameter Cowles sawblade mixer and mixing at 2000 rpm for 30 minutes, the Component II comprising:
 an aqueous polymer composition, preferably, a film-forming aqueous polymer composition; and,
 a polycation that sets an anionically stabilized stabilized polymer, wherein the composition is stabilized with a nonionic surfactant, a polyethoxylated anionic surfactant having an average of from 7 to 100 or, preferably, 9 to 60, or, more preferably, from 15 to 50 ethylene oxide groups per molecule, or a mixture of two or more thereof.

In Component II, suitable total amounts of the polycation as solids may range from 0.8 to 20 wt. % or, preferably, from 1 to 10 wt. %, based on the total weight of Component II. Suitable total amounts of the surfactant in Component II may range from 0.5 to 6.5 wt. % or, preferably, from 0.8 to 5.5 wt. %, based on the total weight of the aqueous polymer composition of Component II. The amount of the film-forming aqueous anionically stabilized polymer composition in Component I may range from 25 to 70 wt. % or, preferably, from 40 to 65 wt. % of the total weight, respectively, of Component I.

The amount of the aqueous polymer composition in Component II may range from 25 to 99.2 wt. % or, preferably, from 40 to 85 wt. % of the total weight of Component II.

In the two-component compositions, the weight ratio of Component I to Component II may range from 50:1 to 1:1 or, preferably, from 20:1 to 5:1.

In accordance with the present invention, the film-forming aqueous anionically stabilized polymer composition in Component I can be an aqueous emulsion polymer, preferably, an aqueous vinyl, acrylic or styrene acrylic emulsion polymer. The film-forming aqueous anionically stabilized polymer composition may comprise, in copolymerized form, (i) one or more acid group-containing monomers or salts thereof in the amount of from 0.4 to 3 wt. % or, preferably, from 0.5 to 2.6 wt. %, based on the total weight of monomers used to make the aqueous emulsion polymer. Further, the film-forming aqueous anionically stabilized polymer composition in Component I has a measured glass transition temperature (measured Tg) of from −50 to 30° C. or, preferably, from −43 to 15° C., wherein the measured Tg is determined by differential scanning calorimetry (DSC) in accordance with ASTM E-1356-08 (2014) and the given homopolymer or copolymer was dried for 24 hours and was then conditioned for at least 12 hours at 60° C. prior to the DSC, and then cooled to a temperature of −70° C. before scanning from −70° C. to 130° C. with a ramp rate of 10° C./minute, and reporting the measured Tg as the inflection point of the curve of heat flow vs. temperature or the maximum value on the plot of its derivative.

Preferably, the film-forming aqueous anionically stabilized polymer composition of Component I is an elastomeric polymer having a measured Tg of 15° C. or less. Preferably, the film-forming aqueous anionically stabilized polymer composition comprises an emulsion polymer of the (i) one or more acid group-containing monomers or salts thereof, preferably, methacrylic acid, salts of methacrylic acid, acrylic acid, salts of acrylic acid, itaconic acid, salts of itaconic acid, or mixtures of two or more thereof, (ii) one or more soft monomers which would if polymerized to yield a homopolymer having a weight average molecular weight of 50,000 or greater form such a homopolymer with a measured Tg of −20 to −150° C., or, more preferably, −30° C. or less; and, (iii) one or more vinyl or acrylic comonomers. In accordance with the present invention, Component I may further contain one or more inorganic pigments, fillers or extenders.

In accordance with the present invention, the aqueous polymer composition in the polycation tolerant Component II may comprise a film-forming aqueous polymer composition wherein the polymer, for example, an aqueous emulsion polymer, such as an acrylic or styrene acrylic polymer, has a measured Tg of from −50 to 60° C. or, preferably, from −43 to 50° C., wherein the measured Tg is determined by differential scanning calorimetry (DSC) in accordance with ASTM E-1356-08 (2014) and the given homopolymer or copolymer was dried for 24 hours and was then conditioned for at least 12 hours at 60° C. prior to the DSC, and then cooled to a temperature of −70° C. before scanning from −70° C. to 130° C. with a ramp rate of 10° C./minute, and reporting the measured Tg as the inflection point of the curve of heat flow vs. temperature or the maximum value on the plot of its derivative. Preferably, the aqueous polymer composition comprises an aqueous emulsion polymer of (ii) one or more soft monomers which would if polymerized to yield a homopolymer having a weight average molecular weight of 50,000 or greater form such a homopolymer with a measured Tg of −20 to −150° C., or, more preferably, −30° C. or less; and (iii) one or more vinyl or acrylic comonomers.

The polycation in the Component II of the present invention may comprise a polycationic polymer, such as a polyfunctional polyamine, or a multivalent cationic metal salt, such as a calcium, magnesium, iron, or aluminum salt, for example, a multivalent metal chloride, such as a divalent metal chloride or a trivalent metal chloride.

In another aspect in accordance with the present invention, methods of making an instant-set coating from a two-component aqueous coating composition comprise:

separately applying streams of each of Component I and Component II, each as set forth above, to a substrate so as to mix the streams of Components I and II with one another in the air, for example, by spray impinging the streams together, or so as to mix Component I and Component II at the surface of the substrate as the two-component aqueous coating composition is applied, for example, by co-spraying the streams onto the substrate.

DETAILED DESCRIPTION

Figure 1A:
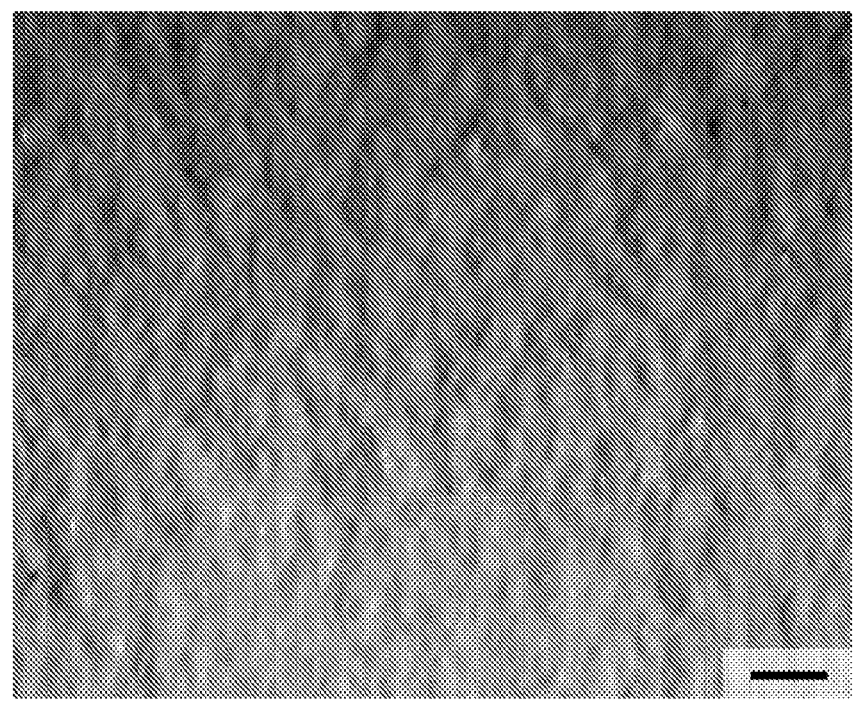
FIG. 1a depicts an optical micrograph of a coating film made by spray applying to a flat substrate the composition of Comparative Example 1 (CE-1) film-forming aqueous polymer composition in the absence of flocculant.

The present inventors have found two-component compositions and methods to provide aqueous coatings, particularly exterior coatings, having a set time much more rapid than the rate of water evaporation while meeting the requirements of the various ASTM D-6083 dry film testing methods, including tensile strength, elongation set and water swelling resistance. Incorporating in Component II an aqueous polymer composition and a nonionic surfactant or anionic surfactant having an average from 7 to 100 ethylene oxide (EO) groups per molecule in Component II stabilizes the aqueous polymer composition against coagulation and provides shear stability with the polycation present. Further, the polycation tolerant Component II having an aqueous polymer composition has been found to greatly improve the film quality of instant-set coatings from aqueous coating compositions. By employing in the polycation-containing Component II an aqueous polymer composition that can function as a binder and by keeping Component II stable, the present invention has enabled an instant-set solution with increased solids content that contributes to film build and quality. The stabilized polycation-containing Component II effectively delays the flocculation of a coating film only for a sufficient time to allow the film to coalesce, thereby forming a more contiguous and smoother coating, and resulting in improved coating performance.

Unless otherwise indicated, conditions of temperature and pressure are room temperature (23° C.) and standard pressure (101.3 kPa), also referred to as "ambient conditions". And, unless otherwise indicated, all conditions include a relative humidity (RH) of 50±10%.

Unless otherwise indicated, any term containing parentheses refers, alternatively, to the whole term as if parentheses were present and the term without them, and combinations of each alternative. Thus, as used herein the term, "(meth)acrylate" and like terms is intended to include acrylates, methacrylates and their mixtures.

The singular forms "a," "an," and "the" include plural referents unless the context clearly dictates otherwise. Unless defined otherwise, the terms used herein have the same meaning as is commonly understood by one skilled in the art.

All ranges recited are inclusive and combinable. For example, a disclosed amount of polycation as solids ranging from 0.8 to 20 wt. % or, preferably, from 1 to 10 wt. %, based on the total weight of Component II, includes each of from 0.8 to 20 wt. % or, from 0.8 to 1 wt. %, or, from 1 to 20 wt. %, or, from 10 to 20 wt. %, or, preferably, from 1 to 10 wt. %, all weight proportions based on the total weight of Component II.

As used herein, the term "addition polymer" means an acrylic or vinyl polymer made by radical addition, e.g. initiation, polymerization. As used herein, the term "aqueous" means water or a mixture of water and a minor portion (no more than 50 wt. %, based on the total weight of the water and any solvent) of one or more water-miscible solvents, or, preferably, a mixture of water and 10 wt. % or less, based on the total weight of water and any water-miscible solvent.

As used herein, the term "ASTM" refers to publications of ASTM International, Conshohocken, Pa.

As used herein, the term "component" refers to a composition containing one or more ingredients which is combined with another component to start a reaction, polymerization or cure. Components are kept separate from one another until combined at the time of use or application. As used herein, unless otherwise indicated, the term "calculated glass transition temperature" or "calculated Tg" refers to the Tg of a polymer calculated by using the Fox equation (T. G. Fox, *Bull. Am. Physics Soc.,* Volume 1, Issue No. 3, page 123 (1956). For reference and use in calculating a Tg, a comprehensive compilation of available data describing glass transition temperatures of homopolymers from suitable monomers can be found in *Polymer Handbook,* Vol. 1, editors Brandrup, J.; Immergut, E. H.; Grulke, E. A., 1999, pages VI/193-277.

As used herein, unless otherwise indicated, the term "coating thickness" refers to an average of at least three measurements of a dried coating applied on a release paper roofing substrate, as measured using an Ames Gage, Model 13C-B2600 (Ames Corporation Waltham, MA).

As used herein, the term "dispersion polymer" means a polymer dispersed in a continuous medium. Aqueous dispersion polymers are dispersed in water and include both emulsion polymers, which are made as aqueous dispersions, and polymers dispersed in water after they were made.

As used herein, the term "ISO" refers to the publications of the International Organization for Standardization, Geneva, CH.

Unless otherwise indicated, as used herein, the term "measured glass transition temperature" or "measured Tg" refers to the mid-point glass transition temperature of a polymer as determined by differential scanning calorimetry, measured using a DSC Q2000 (TA Instruments, New Castle, Del.) in accordance with ASTM E-1356-08 (2014), wherein a given polymer was dried for 24 hours and then conditioned for a period of at least 12 hours at 60° C. prior to the DSC, and then cooled to a temperature of −70° C. before scanning from −70° C. to 130° C. with a ramp rate of 10° C./minute. The Tg recorded is the inflection point of the curve of heat flow vs. temperature or the maximum value on the plot of its derivative.

As used herein, the term "(meth)acrylate" means acrylate, methacrylate, and mixtures thereof and the term "(meth) acrylic" used herein means acrylic, methacrylic, and mixtures thereof.

As used herein, the term "hard monomer" means any monomer which would if polymerized to yield a homopolymer having a weight average molecular weight of 50,000 or greater form such a homopolymer with a measured glass transition temperature of 10° C. or more, or, preferably, 25° C. or more. Examples include (meth)acrylonitrile, methyl methacrylate, ethyl methacrylate, isopropyl methacrylate, and styrene.

As used herein, the term "soft monomer" refers to any $C_4$ to $C_{24}$ alkyl (meth)acrylate monomer which would if polymerized to yield a homopolymer having a weight average molecular weight of 50,000 or greater form such a homopolymer with a measured glass transition temperature of from −20 to −150° C., or, preferably, −30° C. or less. For reference, a comprehensive compilation of available data describing known glass transition temperatures of homopolymers can be found in Polymer Handbook, Vol. 1, editors Brandrup, J.; Immergut, E. H.; Grulke, E. A., 1999, pages VI/193-277.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "based on the total weight of monomers used to make a copolymer," refers to the total of monomers as solids and excludes chain transfer agents.

As used herein, the term "polycation tolerant" means that a given polycation containing composition (i) does not separate, precipitate out or produce a visible sediment, when left to stand on a shelf at from 20 to 25° C. and atmospheric pressure for 2 or more days (48 hours) or, preferably, 7 days (168 hours) or longer, and, further, that (ii) is "shear tolerant", which as used herein means that the composition flows and is free of grit or coagulation after mixing it with a polycation slurry, as determined by adding 200 g of the Component II composition, along with 5 drops of a defoamer of a polysiloxane in polyglycol, to a slurry prepared with a bench top mixer and consisting of 200 g of $BaSO_4$ powder and 50 g of water contained in a 10 cm diameter, 1 L metal grind pot and then homogenizing the resulting Component II-slurry mixture mixing using a 5.5 cm diameter Cowles sawblade mixer and mixing at 2000 rpm for 30 minutes.

As used herein, the term "substantially free of volatile organic compounds" means that a composition contains less than 50 g/l, based on the total weight of the composition, or, preferably, less than 25 g/l of the total amount of organic solvents, including glycol ether amines, coalescing solvents and all other organic solvents in a given composition.

As used herein, the term "substantially zinc free" or "substantially multivalent transition metal ion free" refers to a composition containing less than 750 ppm, or, preferably, less than 500 ppm of zinc, whether in elemental form, i.e. as a metal, as an ion or as that portion of a compound that is itself zinc, such as the zinc in zinc oxide or its salt.

As used herein, the term "total solids" or "solids" means all materials in a given composition aside from solvents, unreactive volatiles, including volatile organic compounds or VOCs, ammonia and water. Solids generally include polymers, polycations, surfactants and pigments. For example, the term "total emulsion copolymer solids" refers to the copolymerized monomers, chain transfer agents, and surfactants in a given emulsion copolymer composition.

As used herein, unless otherwise indicated, the term "average particle size" means a weight average particle size as determined by light scattering (LS) using a Zetasizer Nano ZS particle size analyzer, Malvern|PANalytical Products, Westborough, MA.

As used herein, the term "weight average molecular weight" or "MW" refers to the weight average molecular weight as measured by aqueous gel permeation chromatography (GPC), using, for aqueous solution polymers (e.g. polymeric polyacids), polyacrylic acid (PAA) standards, and, for aqueous emulsion copolymers, polystyrene standards.

As used herein, the phrase "wt. %" stands for weight percent.

In accordance with the present invention, a two-component aqueous coating composition enables rapid setting of aqueous coatings via conventional application methods, such as spray applying. Each of Component I and Component II of the present invention has a rheology such that it can be sprayed by an airless sprayer or other spray techniques known to one skilled in the art. Suitable viscosity can vary depending on the application, spray technique, and equipment used. For example, for coatings of a thickness such as 1000 μm or greater that can be applied with wider spray tips, a suitable viscosity at 25° C. and 1 atm pressure may range from 50 to 20000 cps, with 50 to 2000 cps being the most common range. Accordingly, the solids content of each of Component I and Component II may range widely, such as from 25 to 75 wt. % or, for example, from 35 to 65 wt. %.

Component I of the aqueous coating composition in accordance with the present invention comprises a film-forming aqueous anionically stabilized polymer composition and one or more surfactants, either as part of the polymer composition itself, such as in the case of an emulsion polymer, or added thereto, such as in the case of a polymer dispersion, or both. Suitable film-forming aqueous anionically stabilized polymer compositions are themselves conventional and may include, for example, acrylic or styrene-acrylic emulsion polymers or dispersions that are formulated with pigments, fillers, rheology modifiers, dispersants, coalescents, antimicrobial agents, and other known coating ingredients. Component I may be formulated at a basic pH, such as from 7.8 to 12, with ammonia or another fugitive base to enhance stability. Component I at a basic pH may further comprise a quick set additive, for example, a polymeric polyamine, such as in the amount of from 0 to 2 wt. %, based on the total weight of Component I.

Component II in accordance with the present invention comprises one or more polycations, such as a multivalent metal salt or a cationic polymer as flocculants, an aqueous polymer composition, such as an aqueous emulsion polymer, and one or more surfactants chosen from a nonionic surfactant, an ethoxylated anionic surfactant and mixtures thereof. To insure that Component II has a suitable viscosity, Component II may further be formulated with one or more rheology modifiers and at various suitable solids contents. Further, if Component II comprises a cationic polymer as a polycation, the resulting viscosity of Component II is proportional to the molecular weight and concentration of the polymeric polycation.

POLYMER COMPOSITIONS

Component I comprises at least one film-forming aqueous anionically stabilized polymer composition; and Component II comprises an aqueous polymer composition.

The film-forming aqueous anionically stabilized polymer composition of the present invention may comprise a vinyl, an acrylic or a styrene acrylic polymer. For example, suitable film-forming aqueous anionically stabilized polymer compositions may comprise an emulsion polymer formed from a monomer mixture of (i) one or more acid group-containing monomers or salts thereof, preferably, methacrylic acid, salts of methacrylic acid, acrylic acid, salts of acrylic acid, itaconic acid, salts or itaconic acid, or mixtures of two or more thereof, (ii) one or more soft monomers which would if polymerized to yield a homopolymer having a weight average molecular weight of 50,000 or greater form such a homopolymer with a measured Tg of −20 to −150° C., or, more preferably, −30° C. or less; and, (iii) one or more vinyl or acrylic comonomers, preferably, styrene, alkyl-substituted styrene, a $C_1$ to $C_3$ alkyl (meth)acrylate, or a mixture of two or more thereof, wherein the measured Tg is determined by differential scanning calorimetry (DSC) in accordance with ASTM E-1356-08 (2014) and the given polymer was dried for 24 hours and then conditioned for a period of at least 12 hours at 60° C. prior to the DSC, which comprised cooling to a temperature of −70° C. before scanning from −70° C. to 130° C. with a ramp rate of 10° C./minute, and reporting the measured Tg as the inflection point of the curve of heat flow vs. temperature or the maximum value on the plot of its derivative.

The aqueous polymer composition in Component II may be a film-forming aqueous polymer composition which provides pigment binding capacity to interact with any pigments, fillers, and extenders so as to enhance the strength of the overall coatings made therefrom. For example, the aqueous polymer composition of Component II may be an emulsion polymer or a suspension polymer much like that of the film-forming aqueous anionically stabilized polymer composition except that the aqueous polymer composition Component II is not solely anionically stabilized. In addition, the aqueous polymer composition in Component II may have a higher measured Tg than the polymer of Component I, which is preferably an elastomeric polymer. For example, the aqueous polymer composition of Component II may comprise an aqueous emulsion polymer, such as an acrylic or styrene acrylic polymer, having a measured Tg of from −50 to 60° C. or, preferably, from −43 to 50° C.

To form the film-forming aqueous anionically stabilized polymer composition of Component I of the present invention, (i) one or more acid group-containing monomers may be included in the monomer mixture. Suitable (i) acid group-containing monomers may include monoethylenically unsaturated carboxylic acids, such as, acrylic acid, methacrylic acid, itaconic acid, crotonoic acid, aconitic acid, atropic acid, maleic acid, maleic anhydride, fumaric acid, vinyl benzoic acid, half-esters of ethylenically unsaturated dicarboxylic acids, half-amides of ethylenically unsaturated dicarboxylic acids, salts thereof, and various mixtures thereof. Other suitable acid monomers include one or more monomethyl itaconate, monomethyl fumarate, monobutyl fumarate, acrylamido propane sulfonate, sodium vinyl sulfonate, 2-acrylamido-2-methylpropanesulfolnic acid, 2-methacryloxyethyl phosphate and phosphoethyl(meth) acrylate. A monoethylenically unsaturated carboxylic acid or its salt is preferred and acrylic acid, methacrylic acid and mixtures thereof are more preferred.

Preferably, the film-forming aqueous anionically stabilized polymer composition in Component I has a measured glass transition temperature (measured Tg) of from $-50$ to $30°$ C. or, preferably, from $-43$ to $15°$ C. and comprises an aqueous acrylic or styrene acrylic emulsion polymer of the. An example of a preferred film-forming aqueous anionically stabilized emulsion polymer composition in accordance with the present invention comprises, in copolymerized form, a monomer mixture of (i) from 0.5 to 3 wt. %, or, preferably, from 0.5 to 2.6 wt. % of one or more acid or acid salt group-containing monomers; (ii) from 32 to 84 wt. % of one or more soft monomers chosen from an acrylate and a methacrylate; and (iii) from 12 to 60 wt. % of one or more hard monomers, preferably, styrene, $\alpha$-methyl styrene, or a $C_1$ to $C_3$ alkyl (meth)acrylate, all monomer wt. % s based on the total weight of monomer solids in the monomer mixture. The emulsion copolymer may further comprise, in copolymerized form, up to 3 wt. % of hydroxyethyl methacrylate, all monomer wt. % s based on the total weight of monomer solids in the monomer mixture.

Suitable (ii) soft monomers for use in the emulsion or suspension polymers in accordance with the present invention may include, for example, a $C_4$ to $C_6$ alkyl (meth) acrylate monomer, such as, for example, n-butyl acrylate (BA), iso-butyl acrylate; a $C_7$-$C_{24}$ alkyl or alkylaryl (meth) acrylate monomer, such as, for example, ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA), the (C12 to C15) alkyl methacrylates, cyclohexyl acrylate and cyclohexyl methacrylate. Preferably, soft monomers are hydrophobic monomers, such as fatty or $C_{12}$ to $C_{18}$ alkyl (meth) acrylates, such as LMA, SMA, n-DMA, and IDMA.

Suitable (iii) hard monomers for use in making emulsion or suspension polymers in accordance with the present invention may include, for example, (meth)acrylic ester monomers including $C_1$ to $C_3$ alkyl (meth)acrylates, such as methyl methacrylate (MMA), ethyl (meth)acrylate and isopropyl methacrylate; $C_1$ to $C_{20}$ cycloaliphatic (meth)acrylates, such as isobornyl methacrylate and cyclohexyl methacrylate; vinyl aromatics, such as styrene, alkylstyrenes (methyl and ethyl), like alpha methyl styrene; (meth)acrylonitrile; (meth)acrylamide or substituted (meth)acrylamides.

Preferably, where emulsion or suspension polymers are used in either of the film-forming aqueous anionically stabilized polymer composition of Component I or the aqueous polymer composition of Component II, the (i) soft monomer comprises a $C_4$ to $C_{24}$ alkyl (meth)acrylate other than t-butyl acrylate, t-butyl methacrylate, n-hexadecyl acrylate, neopentyl (meth)acrylate, isobornyl (meth)acrylate, butyl methacrylate, isobutyl methacrylate and t-butyl methacrylate.

Preferably, to avoid water sensitivity in composition made therefrom, the amount of (meth)acrylamide or substituted (meth)acrylamides used as a hard monomer ranges up to 2 wt. %, or, preferably, up to 1.25 wt. %, based on the total solids in the monomer mixture.

Preferably, the aqueous polymer composition of Component II of the present invention comprises an aqueous emulsion polymer of (i) one or more soft monomers which would if polymerized to yield a homopolymer having a weight average molecular weight of 50,000 or greater form such a homopolymer with a measured Tg of $-20$ to $-150°$ C., or, more preferably, $-30°$ C. or less; and (ii) one or more vinyl or acrylic comonomers, preferably, styrene, alkyl-substituted styrene, a $C_1$ to $C_3$ alkyl (meth)acrylate, or a mixture of two or more thereof, wherein the measured Tg is determined by differential scanning calorimetry (DSC) in accordance with ASTM E-1356-08 (2014) and the given homopolymer or copolymer was dried for 24 hours and then conditioned for a period of at least 12 hours at $60°$ C. prior to the DSC which comprises cooling to a temperature of $-70°$ C. before scanning from $-70°$ C. to $130°$ C. with a ramp rate of $10°$ C./minute, and reporting the measured Tg as the inflection point of the curve of heat flow vs. temperature or the maximum value on the plot of its derivative.

An example of a preferred film-forming aqueous polymer composition in accordance with Component II of the present invention comprises, in copolymerized form, a monomer mixture of (ii) from 32 to 84 wt. % of one or more soft monomers chosen from an acrylate and a methacrylate; (iii) from 12 to 60 wt. % of one or more hard monomers, preferably, styrene, $\alpha$-methyl styrene, or a $C_1$ to $C_3$ alkyl (meth)acrylate, (i) acid group-containing monomers including one or more of up to 0.5 wt. % of acrylic acid or its salts, up to 2.6 wt. % of methacrylic acid or its salts, and (iv) up to 0.1 wt. % of each of acrylamide and hydroxyethyl methacrylate as auxiliary monomers, all monomer wt. %s based on the total weight of monomer solids in the monomer mixture.

The polymerization techniques used for preparing the film-forming aqueous anionically stabilized polymer compositions of Component I of the present invention and the aqueous polymer compositions of Component II are well known in the art. Either polymer may be prepared by aqueous suspension polymerization or by emulsion polymerization. Emulsion polymerization is preferred.

Any aqueous emulsion polymers useful in the present invention may be prepared by aqueous free radical emulsion polymerization. Suitable aqueous emulsion polymerization techniques are well known in the polymer art, and include multiple stage polymerization processes. Accordingly, a suitable emulsion polymerization method to make either of the film-forming aqueous anionically stabilized polymer composition or the aqueous polymer composition of the present invention may be catalyzed by an initiator, such as thermal initiators like a peracid, persulfate, peroxide (e.g. benzoyl peroxide), hydroperoxide, peroxyester or its salt, for example, ammonium persulfate, or by a redox polymerization method which contains combinations of substantially water-soluble oxidants and reductants such as, for example, tert-butyl hydroperoxide, metabisulfite or sulfite salts and sodium bisulfite, with or without added transition metal catalysts such as iron, cobalt, or manganese salt. Suitable initiator amounts may range, for example, from 0.05 to 3.0 wt. %, all weight percentages based on the total monomer solids. The redox systems using the same initiators coupled with a suitable reductant, such as, for example, sodium bisulfite, may be used at similar levels. Polymers and copolymers of alpha-beta ethylenically unsaturated monomers and their esters, especially the acrylic and methacrylic esters, may be prepared by processes given in "Emulsion Polymerization of Acrylic Monomers: May 1966" published by the Rohm and Haas Company, Philadelphia, Pa.

Any suspension polymers suitable for use in the present invention may be made by shot polymerization in the presence of one or more initiators and under shear. Suspension polymerization does not generally include any surfactants. Accordingly, the surfactant in either Component I or Component II of the present invention may be added to any suspension polymer after polymerization.

To control the molecular weight of any obtained emulsion or suspension polymer, polymerization may be conducted in the presence of a chain transfer agent. Examples of suitable chain transfer agents include 3-mercaptopropionic acid, dodecyl mercaptan, methyl 3-mercaptopropionate, benzenethiol, azelaic alkyl mercaptan, or mixtures thereof. The concentration of the chain transfer agent in total may range from 0.01 wt. % or more, 0.05 wt. % or more, or even 0.1 wt. % or more, or, 5 wt. % or less, 3 wt. % or less, or 2 wt. % or less, based on the total weight of monomers used to make the emulsion or suspension polymer. Preferably, for emulsion or suspension polymers made from more than 20 wt. %, based on total monomer solids, of (ii) soft monomers, the chain transfer agent is hydrophobic, such as n-dodecyl mercaptan (n-DDM or DDM) or any $C_4$ to $C_{18}$ mercaptan.

For a given monomer, the proportion of the monomer based on the total weight of monomers used in preparing an aqueous polymer is substantially the same as the proportion of copolymerized such monomer, based on the solids weight of the polymer.

One suitable polymerization method comprises aqueous emulsion polymerization in the presence of a surfactant. Polymer particle size in the film-forming aqueous anionically stabilized polymer composition of Component I of the present invention may be controlled by the amount of conventional surfactants added during emulsion polymerization. Typical anionic emulsifiers include the salts of fatty rosin and naphthenic acids, condensation products of napthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Meanwhile, polymer particle size in the aqueous polymer composition of Component II of the present invention may be controlled by the amount of nonionic emulsifiers, ethoxylated anionic surfactants, or their combination. Typical nonionic emulsifiers include alkylpheniol ethoxylates, polyoxyethylenated alkyl alcohols, amine polyglycol condensates, modified polyethoxy adducts, long chain carboxylic acid esters, modified terminated alkylaryl ether, and alkylpolyether alcohols. Ethoxylated anionic surfactants may comprise anionic surfactants containing a minimum of 7 ethylene oxide groups per molecule, as determined by the number of units of ethylene oxide used to form on average each molecule of the surfactant. The amount of the surfactant used in emulsion polymerization may range from 0.01 wt. % or more, 0.3 wt. % or more, or even 0.5 wt. % or more, and at the same time, 3 wt. % or less, 2.5 wt. % or less, or even 2 wt. % or less, based on the total weight of monomers used to make a given polymer.

Suitable aqueous anionically stabilized polymer compositions or aqueous polymer compositions may have polymer solids contents ranging 35 wt. % or more, 30 wt. % or more, or 35 wt. % % or more, or, 75 wt. % or less, 68 wt. % or less, or 65 wt. % or less, based on the total weight of the emulsion.

Suitable harder aqueous polymer compositions for use in the present invention may have a measured Tg of −5° C. or higher, or 15° C. or higher, or, 60° C. or lower, 50° C. or lower, or 35° C. or lower. Suitable commercially available aqueous polymer compositions may include, for example, RHOPLEX™ 2500 acrylic emulsion (The Dow Chemical Company, Midland, MI (Dow)).

Suitable soft emulsion polymers useful in the present invention may have a measured Tg of −5° C. or lower, or, −8° C. or lower, or −10° C. or lower, and at the same time, −50° C. or higher, −43° C. or higher. Suitable commercially available soft vinyl or acrylic emulsion polymers may include, for example, ELASTANE™ 2848NG, RHOPLEX™ EC-1791 and RHOPLEX™ EC-2540 acrylic emulsions (Dow).

SURFACTANTS

In accordance with the present invention, Component I comprises one or more surfactants in a total amount of from 0.04 to 3 wt. % or, preferably, from 0.2 to 2.0 wt. % of one or more surfactants, based on the total weight of Component I.

The Component II of the present invention further comprises a nonionic surfactant a polyethoxylated anionic surfactant, such as an anionic surfactant having an average of from 7 to 200 or, preferably, from 15 to 100, or, more preferably, from 25 to 100 ethylene oxide groups, or a mixture of two or more thereof. Component II may comprise from 0.5 to 6.5 wt. % or, preferably, from 0.8 to 5.5 wt. %, of one or more nonionic and/or polyethoxylates anionic surfactants, based on the total weight of the aqueous polymer composition of Component II. The surfactant in Component II may comprise the surfactant used to make an emulsion polymer and added surfactant.

In either Component I or II, or in both of them, the surfactant may be included as part of emulsion polymerizing or separately, such as in forming an aqueous dispersion of a polymer, such as a suspension polymer in water.

POLYCATION

The polycation in the Component II of the present invention may comprise a polycationic polymer, such as a polyfunctional polyamine, or a multivalent metal salt, such as a divalent salt, such as calcium, magnesium, iron, or aluminum salt, for example, a multivalent metal chloride like calcium chloride or magnesium chloride.

In multivalent metal polycations, trivalent metals, such as iron, may be more efficient than divalent metals, such as calcium and accordingly can be used in lower relative amounts.

Polycations may also comprise a polyfunctional polyamine, such as, for example, a poly(quaternary amine), such as any of poly(diallyldimethylammonium chloride) or polyDADMAC, and polymers of amine containing vinyl or acrylic monomers. Suitable amine containing vinyl or acrylic monomers may include, for example, the alkylaminoalkyl esters of α, β unsaturated carboxylic acids like acrylic acid, methacrylic acid or itaconic acid, such as, for example, dimethylaminoethyl(meth)acrylate, beta-amino-ethyl(meth)acrylate. t-butylaminoethyl(meth)acrylate, dipropylaminoetlyl (meth)acrylate, methylaminoethyl (meth)acrylate, N-methyl-N-hydroxyethylaminoethyl(meth) acrylate, N-(mono-n-butyl)-4-aminobutyl (meth)acrylate, methacryloxyethoxyethylamine and various mixtures thereof. Polyfunctional polyamines as cationic polymers may also be made from alkylaminoalkyl amides of unsaturated acids, such as, acrylic acid and methacrylic acid, for example, N-beta-aminoethyl (meth)acrylamide, N-monom-ethylaminoethyl(meth)acrylamide, dimethylaminopropyl (meth)acrylamide, and mixtures thereof; aminoalkyl vinyl ethers or sulfides, such as, beta-aminoethyl vinyl ether or sulfide, N-monomethyl-beta-aminoethyl vinyl ether or sul-fide. N-monobutyl-beta-aminoethyl vinyl ether or sulfide, N-monomethyl-3-anminopropyl vinyl ether or sulfide, and various mixtures thereof; vinyl pyridines, such as, 2-vinyl pyridine, 3-vinyl pyridine. 2-ethyl-5-vinyl pyridine, and various mixtures thereof; N-acryloxyalkyl-oxazolidine; N-acryloxyalkyltetrahydro-1,3-oxazine; and various mixtures thereof.

One suitable polyfunctional polyamine may be copoly-merized from a monomer mixture containing from 80 to 98 wt. %, or, preferably, from 85 to 96 wt. % of at least one amine containing vinyl or acrylic monomer and from 20 to 2 wt. %, or, preferably from 15 to 4 wt. %, of at least one acid group-containing monomer, all weight percentages based on the total weight of the monomer mixture. Such suitable polyfunctional amines can be made in the manner set forth in U.S. Pat. No. 6,013,721, to Schall et al.

Suitable polyfunctional amines may have a gel perme-ation chromatography (GPC) weight average molecular weight ranging from 10,000 to 1,000.000, or, preferably from 20,000 to 300,000, or, more preferably from 20,000 to 200,000. If the GPC weight average molecular weight of the polyfunctional amine polymer exceeds the upper limit. the shear tolerance of the resulting Component II and the drying time of the two-component composition may be impaired.

Suitable amounts of the polycation in Component II may range from 0.8 to 20 wt. % or, preferably, 10 wt. % or less, based on total weight of Component II. Trivalent metal salts as multivalent metal polycations may be used at from 1 to 3 wt. %, based on the total weight of Component II.

OTHER MATERIALS

Component I of the present invention may further contain one or more inorganic pigments, fillers, and extenders including but not limited to calcium carbonate, titanium dioxide and zinc oxide. Suitable amounts of such pigments may range from volume solid concentrations (% VS) of 20 to 65%, or, preferably, from 25 to 55%, such as from 42 to 44%. Component II may not contain any pigments, fillers, or extenders.

Each of Component I and Component II of the present invention may, independently, further comprise one or more additives added after polymerization, for example, for the purpose of dispersing, coalescing, stabilizing etc. at total concentrations of 3 wt. % or less of total surfactant in Component I, and of 6.5 wt. % or less of total surfactant in Component II, based on the respective total weight of that component, including any surfactants contained in any emulsion polymer. Each of Component I and Component II may further comprise optional coatings ingredients com-monly known in the art, including any of rheology modifi-ers, biocides, antimicrobials, coalescents, neutralizers, humectants, colorants, defoamers, and hydrophobic addi-tives, such as a hydrolysable silane containing an organic group.

Methods of applying the two-component compositions of the present invention may comprise any conventional appli-cation method wherein the two components are combined on application, either as applied streams or on the substrate. One such method comprises separately applying streams of each of Component I and Component II to the substrate so as to mix the streams of Components I and II with one another in the air, for example, by spray impinging the streams together. Another method comprises separately applying Component I and Component II to a substrate so as to mix Component I and Component II at the surface of the substrate as the coating is applied, for example, by co-spraying the streams onto the substrate.

Suitable uses for the two-component compositions in accordance with the present invention may include any exterior coatings, such as roofing applications, exterior architectural coatings, industrial coatings and factory applied coatings. For example, the two-component compo-sitions of the present invention may be applied to a wide variety of weathered and unweathered roofing substrates, such as, for example, asphaltic coatings, roofing felts, syn-thetic polymer membranes; foamed polyurethane, for example, spray polyurethane foam; and metals, such as aluminum; thermoplastic polyolefins (TPO), silicone rubber and ethylene propylene diene rubber (EPDM) or to previ-ously painted, primed, undercoated, worn, or weathered substrates, such as metal roofs, weathered TPO, weathered poly (vinyl chloride) (PVC), weathered silicone rubber and weathered EPDM rubber. Other suitable substrates include modified bitumen membrane.

EXAMPLES

The following examples illustrate the present invention. Unless otherwise indicated, all parts and percentages are by weight and all temperatures are in ° C. and all preparations and test procedures are carried out at ambient conditions of room temperature (23° C.) and pressure (1 atm). In the Examples and Tables 1, 2A, 2B, 2C, 3, 4 and 5, below, the following abbreviations not otherwise defined were used:

RPM or rpm: revolutions per minute; AA: Acrylic acid; BA: Butyl acrylate; HEMA: 2-Hydroyethyl methacrylate; MAA: Methacrylic acid; MMA: Methyl methacrylate; nDDM: n-Dodecyl mercaptan; APS: Ammonium persulfate; FF6 reducing agent: BRUGGOLITE FF6 M reducing agent, a mixture of 2-hydroxy-2-sulfonatoacetic acid and 2-hy-droxy-2-sulfinatoacetic acid (L. Briggemann KG, Heil-bronn, DE); Sty: Styrene; EO: Ethylene oxide; DI: Deion-ized. Materials: All the materials used to make the aqueous coating composition formulation are listed in Table 1, below.

TABLE 1

| Materials | |
| --- | --- |
| Name and Description | Source |
| Sodium Polycarboxylate dispersant | TAMOL ™ 851 dispersant (The Dow Chemical Co., Midland, MI, (Dow)) |
| Potassium tripolyphosphate or KTPP | Fisher Scientific, Hampton, NH |
| Mineral oil-hybrid technology defoamer | DEE FO 1015 defoamer, Münzing Chemie Bloomfield, NJ |
| Ground calcium carbonate | SNOWHITE 12 (Omya, Proctor, VT) |
| Rutile titanium dioxide | TI-PURE R-960 pigment (Chemours. Wilmington, DE) |
| Zinc oxide | ZOCO 101 (Zochem Inc., Dickson, TN) |
| Ester alcohol coalescent | TEXANOL co-solvent (Eastman Chemical, Kingsport, TN) |
| Hydroxyethyl methyl cellulose (HEMC) Rheology Modifier | WALOCEL ™ MT 30000PV cellulosic (Dow) |
| Anionically stabilized acrylic emulsion polymer 1 <200 cps @ 25° C., Tg (DSC) −37° C., 55 wt. % solids, 0.15 wt. % sodium dodecyl benzene sulfonate and 1.6 wt. % MAA based on the total weight of monomers used to form the polymer | — |
| Anionically stabilized acrylic emulsion polymer 2 with polymeric polyamine fast setting additive <400 cps @ 25° C., Tg (DSC) −37° C., 55 wt. % solids, 0.1 to 0.15 wt. % sodium dodecyl benzene sulfonate and 1.3 wt. % MAA based on the total weight of monomers used to form the polymer | — |
| Anionically stabilized acrylic emulsion polymer 3 with polymeric polyamine fast setting additive <100 cps @ 25° C., Tg (DSC) −37° C., 51 wt. % solids, 0.15 wt. % sodium dodecyl benzene sulfonate and 1.6 wt. % MAA based on the total weight of monomers used to form the polymer | — |
| Flocculant 1: Calcium chloride dihydrate | Fisher Scientific, (Waltham, MA) |
| Flocculant 2: PolyDADMAC 20% (w/w) solution in H₂O, 600 to 900 cp @ 25° C., Ave MW 400,000-500,000 Da | Sigma Aldrich, St. Louis, MO (Sigma) |
| Barium Sulfate (BaSO₄, 4 μm) | Sigma |
| polysiloxane solid in polyglycol | BYK 022 Defoamer (BYK Chemie, Wallingford, CT) |
| 4 EO C₁₂-C₁₄ fatty alcohol ethersulfate | DISPONIL FES 32 Surfactant (BASF, Florham Park, NJ (BASF)) |
| 12 EO C₁₂-C₁₄ fatty alcohol ethersulfate | DISPONIL FES 993 Surfactant, BASF |
| 30 EO fatty C₁₂-C₁₄ alcohol ethersulfate | DISPONIL FES 77 Surfactant, BASF |
| sodium dodecyl benzene sulfonate | RHODACAL ™ DS-4 Surfactant (Solvay, Syracuse, NY) |
| 5 EO C₁₂-C₁₄ secondary alcohol ethoxylate | TERGITOL ™ 15-S-5 Surfactant (Dow) |
| 9 EO C₁₂-C₁₄ secondary alcohol ethoxylate | TERGITOL ™ 15-S-9 Surfactant (Dow) |
| 15 EO C₁₂-C₁₄ secondary alcohol ethoxylate | TERGITOL ™ 15-S-15 Surfactant (Dow) |
| 40 EO C C₁₂-C₁₄ secondary alcohol ethoxylate | TERGITOL ™ 15-S-40 Surfactant (Dow) |
| 35 EO octylphenol ethoxylate | TRITON ™ X-405 Surfactant (Dow) |

Polycation Polymer Synthesis Example 1: Liquid Binder 1 (LB 1)

LB-1 was prepared in a 5 L four neck round bottom flask reactor (flask 1) equipped with an agitator, thermocouple, and a nitrogen inlet. 800 grams of deionized water (DI) was added to flask 1, followed by 1.0 grams of sodium carbonate dissolved in 30 grams of DI water. Flask 1 was blanketed under nitrogen and heated to 85° C.

In a separate flask 2, a monomer emulsion was prepared by adding 575 grams of DI water followed by 7.5 grams of a 4 EO C₁₂-C₁₄ fatty alcohol ethersulfate surfactant. With mixing sufficient to form a vortex, 1553.5 g of BA were added and homogenized, followed by the addition of 803.9 g of MMA, and 20.0 g of MAA.

In a second separate flask 3 A catalyst cofeed was prepared by dissolving 2.6 g of ammonium persulfate in 150 mL of DI water.

A solution consisting of 4.0 g of ammonium persulfate in 30 grams of the water, followed by a solution of 3.4 of 30% ammonia in was to Flask 1 and then 138.8 g of an acrylic polymer seed (100 nm, 45% solids) was added. The temperature in Flask 1 was maintained at 85° C., and the contents of the monomer emulsion from Flask 2 and catalyst cofeed from Flask 3 were fed evenly to the reactor over 180 minutes. After the feeds were complete, Flask 1 was held at 85° C. for 10 minutes, and then cooled to 75° C. 2.6 g of 30% ammonia was diluted with 5 g of DI water, and then was added to Flask 1. 10.7 g of a 0.15% of ferrous sulfate was added to Flask 1. Then, the residual monomer in Flask 1 was chased by concurrently cofeeding thereto over 20 minutes, 3.1 g of 70% aqueous t-butylhydroperoxide, in 35 g of DI water and 2.4 g of sodium formaldehyde sulfoxylate in 65 g of DI water. Then 20.3 g of 30% ammonia was added to Flask 1 and the contents were cooled to room temperature to form an emulsion polymer having a pH of 9.8, solids 55.6 wt. %, weight average (LS) particle size 309 nm, Viscosity (Brookfield LV, Spindle #2, 60 rpm, 25° C.)<200 cps, Calculated Tg:−16° C.

Polycation Polymer Synthesis Example 2: Liquid Binder 2 (LB-2)

The emulsion polymer LB-2 was prepared as described in the making of LB-1, above, except that the 7.5 grams of 4 EO C₁₂-C₁₄ fatty alcohol ethersulfate surfactant was replaced with 10.6 g of sodium dodecyl benzene sulfonate (22 wt. % active). Emulsion polymer pH 9.6, 55.2 wt. % solids, weight average (LS) particle size 302 nm, Viscosity (Brookfield LV, Spindle #2, 60 rpm, 25° C.)<200 cps, Calculated Tg: −16° C.

Polycation Polymer Synthesis Example 3: Liquid Binder 3 (LB-3)

Using the same Flask 2 as in synthesis of LB-1, above, a monomer emulsion (ME) was prepared by mixing 470 g of DI water and 29.4 g sodium dodecyl benzene sulfonate (22 wt. % active). Then under sufficient mixing to maintain a vortex, 2074 g of BA was added followed by 44 g of MMA, 43 g of HEMA, 11 g of MAA, and 33 g of AA.

The polymerization was run in a four neck 5 L round bottom reactor (Flask 1) equipped with agitator, thermocouple, and a nitrogen inlet. 435 g of deionized water was added to Flask 1 and heated to 90° C. A solution containing 6.3 g of APS and 23.9 g of water was added to Flask 1 followed by 3.5 g of a 28 wt. % solution of ammonia in water, 5.7 g of a 0.15 wt. % solution of ferrous sulfate in water, and 34.8 g of a 44% solids 100 nm acrylic polymer seed emulsion.

Then an initiator co-feed solution consisting of 3% solution of APS in water was fed to flask 1 at a rate of 1.1 g/min for 90 min, the temperature of the flask was set to 85.0° C. and the monomer emulsion was fed (monomer feed) from Flask 2 to Flask 1 over a period of 90 minutes.

At 38 minutes after the initiation of the monomer feed, 53.8 g of a 41% solids 62 nm acrylic polymer seed emulsion and 15.7 g of water were added to Flask 1.

At 65 minutes after the initiation of the monomer feed, 1.1 g of n-dodecyl mercaptan and 7.9 g of DI water were added to the Flask 2.

After completing the monomer feed and initiator co-feed, the temperature of the reaction mixture in Flask 1 was held at 85° C. for 15 minutes and afterward cooled to 75° C. The residual monomers were chased by addition of 4.1 g of a 70% solution of tert-butylhydroperoxide in water dissolved in 11.8 g of water and a solution consisting of 2.7 g of FF6 reducing agent in 49.3 g of DI water. 31.4 g of 40 EO C $C_{12}$-$C_{14}$ secondary alcohol ethoxylate surfactant was added to Flask 1 and the contents were cooled to room temperature. The emulsion polymer had a pH 4.5, 62.7 wt. % solids, weight average (LS) particle size 379 nm, Viscosity (Brookfield LV, Spindle #2, 60 rpm, 25° C.)<500 cps, Calculated Tg: −49° C.

Polycation Polymer Synthesis Example 4: Liquid Binder 4 (LB-4)

LB-4 was prepared by emulsion polymerization in a 5 L four neck round bottom flask (Flask 1) equipped with an agitator, thermocouple, and a nitrogen inlet. 985 grams of deionized water (DI) was added to Flask a, followed by 7 grams a 0.15% solution of ferrous sulfate in water. Flask 1 was blanketed under nitrogen and heated.

A monomer emulsion was prepared in a separate flask (Flask 2) by adding 682 g of water and 131 g of a 70 wt. % solution of 35 EO octylphenol ethoxylate surfactant. The mixture was agitated to maintain a vortex, and 1212 g of BA followed by 600 g of MMA and 23.9 g of MAA were added A portion of the monomer emulsion was transferred from Flask 2 to Flask 1 and then initiator solutions consisting of 1.2 g of APS in 100 g of DI water and 1.8 g of sodium bisulfate in 100 g of water as well as the remainder of the monomer emulsion were fed evenly to Flask 1 over 90 minutes. After the monomer emulsion was converted the remaining feeds were fed to Flask 1 over 90 minutes. The residual monomers were chased by addition of 2.6 g of 70 wt. % aqueous t-butyl hydroperoxide in 25 g of DI water and 3.9 g of sodium bisulfate in 40 g of DI water. 16.7 g of 30 wt. % aqueous ammonia were then added and the reaction was cooled to room temperature. LB-4 Viscosity (Brookfield LV, Spindle #2, 60 rpm, 25° C.)<200 cps, Calculated Tg: −17° C.

Polycation Polymer Synthesis Example 5: Liquid Binder 5 (LB-5)

LB-5 was prepared as described in the method for making LB-4, above, except the monomer mixture in the monomer emulsion was changed to 955 g of BA, 857 g of MMA, and 24.3 g of MAA. Viscosity (Brookfield LV, Spindle #2, 60 rpm, 25° C.)<200 cps, Calculated Tg: 2° C.

Polycation Polymer Synthesis Example 6: Liquid Binder 6 (LB-6)

LB-6 was prepared by emulsion polymerization in a 5 L four neck round bottom flask (Flask 1) equipped with an agitator, thermocouple, and a nitrogen inlet. 600 g of DI water was added to Flask 1 followed by 3.8 g of 12 EO $C_{12}$-$C_{14}$ fatty alcohol ethersulfate surfactant (30 wt. % actives in water) and 4.5 g of 40 EO C $C_{12}$-$C_{14}$ secondary alcohol ethoxylate surfactant (70 wt. % actives in water). A solution of 5.2 g of sodium bicarbonate in 53 g of water was added to Flask 1, which was heated to 90° C.

In a separate flask (Flask 2), a monomer emulsion was prepared by mixing 9.3 g of 40 EO C $C_{12}$-$C_{14}$ secondary alcohol ethoxylate surfactant (70 wt. % actives in water) and 34.1 g of 12 EO $C_{12}$-$C_{14}$ fatty alcohol ethersulfate surfactant (30 wt. % active in water) into 500 g of DI water. 38.5 g of acrylamide was added to Flask 2 followed by 1380 g of BA, 556 g MMA, and 9.9 g of HEMA. A solution containing 2.1 g of sodium persulfate and 20 g of water was added to Flask 1 followed by 120 g of an acrylic polymer seed (weight average (LS) particle size 100 nm, 45 wt. % solids, Calculated Tg: −19° C, Viscosity<600 cps).

The monomer emulsion was fed to Flask 1 over 120 minutes, and concurrent with that feed, a separate catalyst co-feed which consisting of 31 g of sodium persulfate in 750 g of DI water was added to Flask 1. The residual monomers were chased by addition of 220 g of a 7 wt. % solution of tert-butyl hydroperoxide and 420 g of a 5 wt. % solution of sodium bisulfite.

Formulation: Each indicated Component I was prepared with conventionally produced gradual addition, single stage emulsion polymer products. Each Component I was prepared using the ingredients shown in the Tables 2A and 2B, below. The grind ingredients were added in order of addition shown and prepared using a high-speed dispersator. The let-down ingredients were added to the grind in the order listed.

TABLE 2A

| Component I, Formulation 1 | |
| --- | --- |
| Name | Grams |
| Grind | |
| Water | 152.5 |
| Sodium Polycarboxylate dispersant | 5.0 |
| KTPP Dispersant | 1.5 |
| Mineral oil-hybrid technology defoamer | 1.5 |
| Ground calcium carbonate | 497.1 |
| Rutile titanium dioxide | 87.7 |
| Zinc oxide | 52.6 |
| Aqueous Ammonia (28 wt. %) | 1.0 |
| End Grind | |
| Let-down | |
| Anionic acrylic emulsion polymer 1 | 475.1 |
| Mineral oil-hybrid technology defoamer | 1.5 |
| Ester alcohol coalescent | 5.3 |

TABLE 2A-continued

| Component I, Formulation 1 | |
|---|---|
| Name | Grams |
| Propylene Glycol | 14.0 |
| Hydroxyethyl methyl cellulose (HEMC) Rheology Modifier | 3.6 |
| Water | 4.5 |

Component I, Formulation 2: Component one, Formulation 2 was prepared in the same manner as formulation 1 except that the anionically stabilized acrylic emulsion polymer 1 was replaced with anionically stabilized acrylic emulsion polymer 2.

TABLE 2B

| Component I Formulation 2 | |
|---|---|
| Material | Grams |
| Grind | |
| Water | 116.3 |
| Sodium Polycarboxylate dispersant | 5.0 |
| KTPP Dispersant | 1.5 |
| Mineral oil-hybrid technology defoamer | 1.5 |
| Ground calcium carbonate | 497.1 |
| Rutile titanium dioxide | 87.7 |
| Zinc oxide | 52.6 |
| Aqueous Ammonia (28 wt. %) | 1.0 |
| End Grind | |
| Let-down | |
| Anionic acrylic emulsion polymer 2 | 475.1 |
| Mineral oil-hybrid technology defoamer | 1.5 |
| Ester alcohol coalescent | 5.3 |
| Propylene Glycol | 14.0 |
| Hydroxyethyl methyl cellulose (HEMC) Rheology Modifier | 3.6 |
| Water | 35.7 |

Component I, Formulation 3: This formulation was prepared in the same manner as Component I formulation 1, above except that the binder was replaced with anionically stabilized acrylic emulsion polymer 3. 513.8 g of binder was used and no water was added in the let down.

Formulation of Component II: To prepare an aqueous polymer composition containing 10 wt. %, as solids of the polycation Flocculant 2 (poly(diallyldimethylammonium chloride)), a 20 wt. % solids aqueous solution of Flocculant 2 was added in a 1:1 wet weight ratio to an anionically stabilized emulsion polymer containing at least 1.1 wt. % of the indicated non-ionic surfactant. Flocculant 2 was added slowly to the emulsion polymer using an overhead mixer and mixed for to 15 minutes to prevent latent agglomeration of the emulsion polymer particles. For lower concentrations of polycation, the polycation was mixed into the emulsion polymer at, respectively, a 1:4 and a 1:8 ratio for a final polycation concentration of 5 wt. % and 2.5 wt. %, respectively. If using Flocculant 1 or calcium chloride dihydrate as the polycation, the solid flocculant was weighed out to the indicated amount and added slowly to the emulsion polymer while mixing using an overhead mixer.

Test Methods: The following test methods were used in the examples that follow:

Polymer Stability with Mulitvalent Metal Polycations (Polymer stability): To measure the polymer dispersion stability in the presence of a cationic flocculant, wherein formulations that are unstable will result in severe thickening, coagulation, or grit formation, and any combination of these effects that render the composition unsuitable for pumping through a spray applicator. The test is conducted by mixing 1 part of a 10 wt. % calcium chloride aqueous solution by weight with 3 weight parts of an aqueous polymer composition or emulsion polymer. If any additional surfactant was post added to the aqueous polymer composition, the addition was done prior to mixing with the calcium chloride solution. A latex passes the test if no grit or coagulum forms within 10 minutes of mixing the components.

Component II Polymer Quick Shear Stability Test: To simulate the shear stresses that can occur from pumping or spraying, the indicated aqueous polymer composition stability with a polycationic polymer was screened by mixing the indicated aqueous polymer composition with optional additional surfactant first, if indicated, followed by addition of an aqueous solution of the polycation. If gel or grit is formed within 10 minutes of mixing, the dispersion fails the test. Dispersion-surfactant combinations that pass this first part were then tested for shear stability.

Shear Tolerance: The shear tolerance of Component II was tested by high shear mixing of the dispersion and, if indicated, added surfactant, in the presence of the indicated polycation. When additional surfactant was used, it was added prior to the polycation. The test was conducted in a 10 cm diameter, IL metal grind pot with mixing using a 5.5 cm diameter Cowles sawblade mixer.

A slurry consisting of 200 g of $BaSO_4$ powder and 50 g of water was prepared with a bench top mixer. Separately, 200 g of the composition of Component II was added to the grind pot along with 5 drops of polysiloxane in polyglycol defoamer to test coagulation. The mixture was homogenized by mixing at 2000 rpm for 30 minutes. Component II passes the shear tolerance test when at the end of the mixing period, the contents flow and are free of grit or coagulation. Results are set forth in Table 3, below.

Dual Component Sprayer Set Up: One airless spray gun Graco Ultra Airless Spray, Graco, Inc., Minneapolis, MN) for each of Component I and Component II was set at an angle of 45° to the indicated horizontal substrate so that the stream from each spray gun impinged upon the stream from the other spray gun prior to contant the substrate.

Spray Application: Component I formulations were added to a disposable 473 mL (1 pint) container mounted on a spray gun positioned on the left-hand side as one looks toward a substrate. Component II formulations or comparative polycation formulations, as indicated, were added to a disposable 473 mL container mounted on a spray gun positioned on the right-hand side as one looks toward a substrate. For comparative polycation compositions, both sample containers were attached to the corresponding airless spray guns and excess air from the headspace of each container was removed by squeezing the plastic insert. Both airless sprayers were primed with the respective sample on pressure Level 7. In general, equal parts of each Component I and Component II were applied. Prior to beginning spray application, airless sprayers were set to the spray position, and a small area of a substrate was coated to ensure proper spray pattern and verify that the equipment was working properly. Unless otherwise indicated, both the coating and flocculant were sprayed in a simultaneous fashion over a 20 cm×20 cm aluminum panel, moving first slowly (~2.54 cm or 1 inch per second) from the left to right direction, then immediately from the right to left direction. However, where indicated the Component I was first spray applied to the surface, in the same fashion described above, followed by a separate spray application of Component II. Depending on the experiment, the pressure of the Component II varied from Level 2 to Level 8. The pressure of the Component I coating formulation remained constant at Level 7, which was determined to be the lowest pressure to effectively spray the fluid. The polycation Component II was sprayed at a 45° angle to the coating Component I, which was applied perpendicular to the substrate surface. All spray applied films were then allowed to cure for two weeks in a climate controlled room at 23° C. and 50% RH, flipping the panels sprayed on the release paper after one week. Final film thickness for the cured films averaged ~500 dry μm (20 dry mils).

Coating Tests: Coatings were formulated as elastomeric roof coatings and tested in accordance with ASTM D-6083-05e1 (2021). Coating test results other than optical microscopy are reported in Table 4, below. Optical microscopy results are reported in Table 5, below.

Water Swelling: Water swelling properties were completed in accordance with ASTM method D471 "Rubber Property-Effect of Liquids." The indicated coating layers were cut with a 2.54 cm (1 inch) diameter die and measured for initial mass. Samples were then placed in individual closed glass vials containing 40 mL of tap water. Masses of samples were recorded after 24 hours and 7 days, and the percent water uptake based on mass was calculated. Prior to measurement, excess water was dabbed off of the sample with absorbent paper. The values reported are the average of three measurements. An acceptable water swelling result for a single coat spray film having a thickness of 500 to 2000 μm is 35 wt. % or less, or, preferably, 25 wt. % or less.

Mechanical Properties: Mechanical properties, including tensile strength and elongation, were determined on the indicated cured coatings in accordance with ASTM method D2370 "Tensile Properties of Organic Coatings." Tensile strength and elongation values were compared against the standards as set by D6083 "Cured Film Physical Property Requirement," of a minimum tensile of 1.4 MPa (200 psi) and a minimum 100% elongation, respectively. The values reported are the average of five measurements.

Figure 1B:
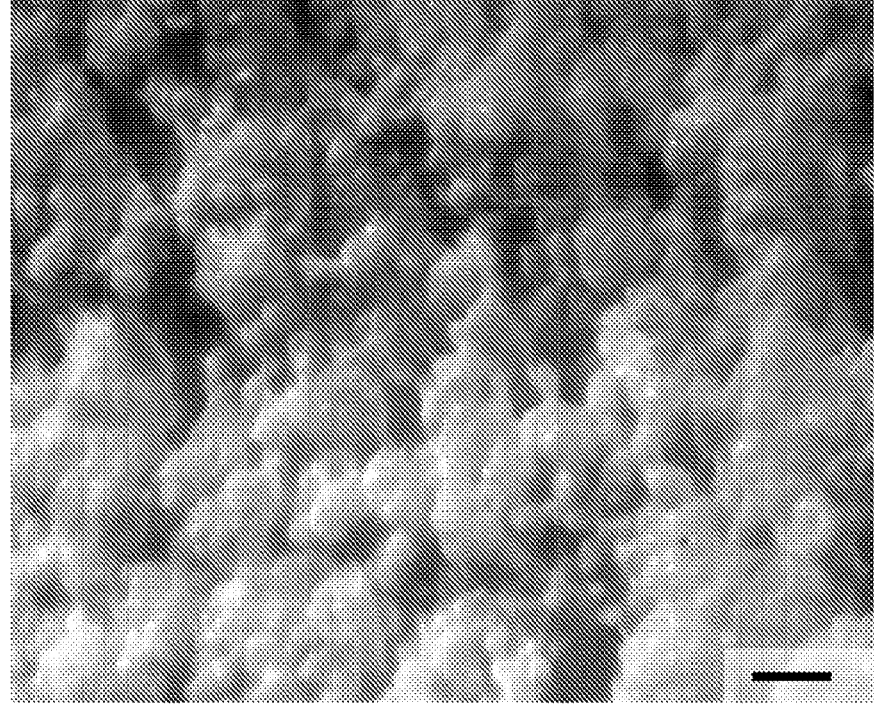
FIG. 1b depicts an optical micrograph of a coating film made by spray applying to a flat substrate the composition of Comparative Example 3 (CE-3), a film-forming aqueous anionically stabilized polymer composition and by spraying separately and simultaneously an aqueous flocculant composition comprising 10 wt. % of calcium chloride, based on the total weight of the composition.

Optical Microscopy: Shown in FIGS. 1a, 1b and 1c, below, the scale bars represent 200 μm. Associated histogram plots reveal the level of heterogeneity across the entire image, indicating the overall surface roughness. Lower values of the standard deviation indicate increased homogeneity along the film surface. Coating levelling data aer presented in Table 5, below. Optical microscopy images were taken of sprayed coating films including:

FIG. 1a shows a control film of Component I Formulation 1 sprayed in the absence of polycation or flocculant (Comparative Example 1A);

FIG. 1b shows a Component I Formulation 1 sprayed with a comparative Component II comprising a 10 wt. % aqueous solution of $CaCl_2$ (Comparative Example 3A).

Figure 1C:
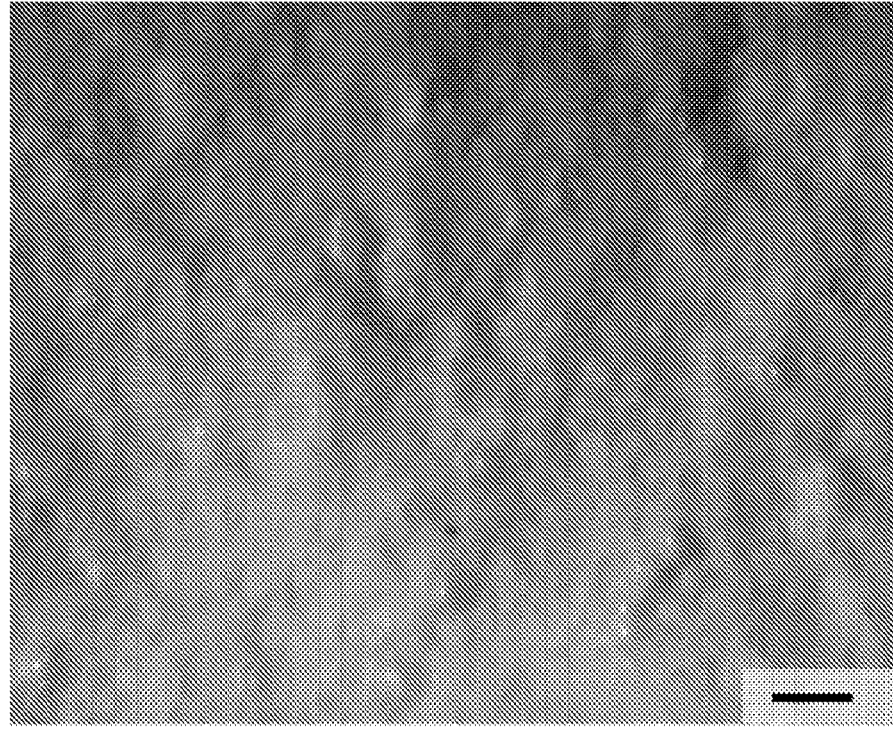
FIG. 1c depicts an optical micrograph of a coating film in accordance with the present invention made by spray applying to a flat substrate the composition of Example 9A, a film-forming aqueous anionically stabilized polymer composition comp and by spraying separately and simultaneously an aqueous flocculant composition comprising a liquid binder (LB-5) and 10 wt. % of calcium chloride, based on the total weight of the composition.

FIG. 1c shows an inventive Component I sprayed with an inventive Component II comprising LPPB-5 and 10% $CaCl_2$ (Example 9A).

TABLE 3

| | | Shear Tolerance Testing Results for Component II | | |
|---|---|---|---|---|
| Example | Polymer Comp | Added Surfactant (wt. % on polymer solids) | Polycation (wt. %) | Polymer Stability \| Shear Tolerance |
| 1* | LB-1 | None | 10% $CaCl_2$ | Fail \| NA |
| 2* | LB-1 | 5% 5 EO $C_{12}$-$C_{14}$ secondary alcohol ethoxylate surfactant | 10% $CaCl_2$ | Fail \| NA |
| 3* | LB-1 | 1% 9 EO $C_{12}$-$C_{14}$ secondary alcohol ethoxylate surfactant | 10% $CaCl_2$ | Fail \| NA |
| 4 | LB-1 | 3% 9 EO $C_{12}$-$C_{14}$ secondary alcohol ethoxylate surfactant | 10% $CaCl_2$ | Pass \| Pass |
| 5 | LB-1 | 1% 15 EO $C_{12}$-$C_{14}$ secondary alcohol ethoxylate surfactant | 10% $CaCl_2$ | Pass \| Pass |
| 6 | LB-1 | 1% 40 EO C $C_{12}$-$C_{14}$ secondary alcohol ethoxylate surfactant | 10% $CaCl_2$ | Pass \| Pass |
| 7 | LB-1 | 1% 35 EO octylphenol ethoxylate surfactant | 10% $CaCl_2$ | Pass \| Pass |
| 8* | LB-1 | 5% sodium dodecyl benzene sulfonate surfactant | 10% $CaCl_2$ | Fail \| NA |
| 9* | LB-1 | 5% sodium dodecyl benzene sulfonate surfactant | 10% $CaCl_2$ | Fail \| NA |
| 10* | LB-1 | 3% 4 EO $C_{12}$-$C_{14}$ fatty alcohol ethersulfate surfactant | 10% $CaCl_2$ | Fail \| NA |
| 11* | LB-1 | 5% 4 EO $C_{12}$-$C_{14}$ fatty alcohol ethersulfate surfactant | 10% $CaCl_2$ | Pass \| Fail |
| 12* | LB-1 | 5% 4 EO $C_{12}$-$C_{14}$ fatty alcohol ethersulfate surfactant | 10% $CaCl_2$ | Pass \| Pass |
| 13 | LB-3 | None | 10% $CaCl_2$ | Pass \| Pass |
| 14 | LB-5 | None | 10% $CaCl_2$ | Pass \| Pass |
| 15 | LB-6 | None | 10% $CaCl_2$ | Pass \| Pass |

*Denotes Comparative Example

As shown in Table 2, above, the Inventive Examples 4, 5,6, and 7 results demonstrated the required stability only when surfactant of sufficient EO length is used. The EO content can be less for nonionic surfactants than for anionic surfactants. Performance of a coating prepared with 5 wt. % of added surfactant in Component I, in addition to surfactant used to make the emulsion copolymer, as in Comparative Examples 8, 9, 11 and 12 would suffer from high water uptake and poor film toughness in the final coating from of surfactant.

TABLE 4

| | | Coating Test Results | | | |
|---|---|---|---|---|---|
| Example | Component I | Component II | Tensile (psi) | Elongation | Water Swell |
| 1A* | Formulation 1 | Water (Not rapid setting) | 1.74 MPa (251.9 psi) | 56.7% | 30.1% |
| 2A* | Formulation 1 | 5 wt. % CaCl$_2$ | 0.76 MPa (110.4 psi) | 41% | 31.7% |
| 3A* | Formulation 1 | 10 wt. % CaCl$_2$ | 0.49 MPa (71.2 psi) | 33% | 20.4% |
| 4A | Formulation 1 | LB-4 with 5% CaCl$_2$** | 1.73 MPa (251.5 psi) | 100% | 35.3% |
| 5A | Formulation 1 | LB-3 with 10 wt. % CaCl$_2$** | 1.06 MPa (153.5 psi) | 36% | 26.5% |
| 6A* | Formulation 2 | 5 wt. % PDADMAC | 0.88 MPa (128.1 psi) | 13% | 19.1% |
| 7A | Formulation 2 | LB-6 with 5 wt. % PDADMAC** | 1.41 MPa (204.3 psi) | 92.6% | 20.0% |
| 8A* | Formulation 3 | 10 wt. % CaCl$_2$ | 1.13 MPa (163.4 psi) | 14.7% | 19.1% |
| 9A | Formulation 3 | LB-5 with 10 wt. % CaCl$_2$** | 1.08 MPa (156.1 psi) | 126.7% | 27.7% |

*Denotes comparative example.

**By total weight of Component II.

The inventive examples 4A, 5A, 7A and 9A show acceptable water swelling resistance. In the final Coating, tensile and elongation properties were found to be dictated by the composition of the emulsion polymer in Component II. The inventive Examples all exhibited dramatically improved tensile and elongation results. Salt polycations generally gave inferior water swelling resistance results when compared to polycation polymers. Side by side tensile and elongation comparisons are: Inventive Example 4A versus Comparative Example 2A showing dramatic improvements; Inventive Example 5A versus Comparative Example 3A showing dramatic tensile improvements; Inventive Example 7A versus Comparative Example 6A showing dramatic improvements; and Inventive Example 9A versus Comparative Example 8A showing dramatic elongation improvements.

TABLE 5

| | Coating Film Levelling (all values are represented by normalized units) | | | |
|---|---|---|---|---|
| Example | Minimum | Maximum | Mean | Standard Deviation |
| 1A | 99 | 235 | 158 | 15 |
| 3A | 45 | 255 | 144 | 37 |
| 9A | 71 | 196 | 127 | 12 |

As shown in Table 5, above, and in FIG. 1c, the inventive coating from Example 9A gave a much more consistent film than that of Comparative Example 3A, as shown in FIG. 1b.

Further, the coating of Inventive Example 9A was smoother and had a lower deviation even than the one component coating of Comparative Example 1A, as shown in FIG. 1a. In general, the inventive two-component solution results in a very significant reduction in voids in the coating film.

The invention claimed is:

1. A two-component instant-set aqueous coating composition comprising:

A. a Component I comprising:

a film-forming aqueous anionically stabilized polymer composition of a polymer having two or more acid functional groups; and, one or more surfactants in a total amount of from 0.04 to 3 wt. %, based on the total weight of Component I; and, B. a polycation tolerant Component II, separate from Component I, comprising:

an aqueous polymer composition in the amount of from 25 to 99.2 wt. %, based on the total weight of component II, wherein the aqueous polymer composition comprises an acrylic polymer or a styrene acrylic polymer; and, from 0.8 to 20 wt. %, based on the total weight of Component II, of a polycation that sets an anionically stabilized polymer, wherein the composition of Component II is stabilized with a nonionic surfactant, a polyethoxylated anionic surfactant having an average of from 7 to 100 ethylene oxide groups per molecule, or a mixture of two or more thereof, and, further wherein, the total amount of the surfactant in Component II ranges from 0.5 to 6.5 wt. %, based on the total weight of the aqueous polymer composition.

2. The two-component instant-set aqueous coating composition as claimed in claim 1, wherein in Component I, the amount of the film-forming aqueous anionically stabilized polymer composition in Component I ranges from 25 to 70 wt. %.

3. The two-component instant-set aqueous coating composition as claimed in claim 1, wherein the weight ratio of Component I to Component II ranges from 50:1 to 1:1.

4. The two-component instant-set aqueous coating composition as claimed in claim 1, wherein in Component I, the film-forming aqueous anionically stabilized polymer composition is an aqueous emulsion polymer comprising, in copolymerized form, (i) one or more acid group-containing monomers or salts thereof in the amount of from 0.4 to 3 wt. %, based on the total weight of monomers used to make the aqueous emulsion polymer; and, further wherein, the film-forming aqueous anionically stabilized polymer composition in Component I has a measured glass transition temperature (measured Tg) of from −50 to 30° C., wherein the measured Tg is determined by differential scanning calorimetry (DSC) in accordance with ASTM E-1356-08 (2014) and the given homopolymer or copolymer was dried for 24 hours and was then conditioned for at least 12 hours at 60° C. prior to the DSC, and then cooled to a temperature of −70° C. before scanning from −70° C. to 130° C. with a ramp rate of 10° C./minute, and reporting the measured Tg as the inflection point of the curve of heat flow vs. temperature or the maximum value on the plot of its derivative.

5. The two-component instant-set aqueous coating composition as claimed in claim 1, wherein the film-forming aqueous anionically stabilized polymer composition of Component I is an elastomeric polymer having a measured Tg of 15° C. or less and is an emulsion polymer of the (i) one or more acid group-containing monomers or salts thereof, (ii) one or more soft monomers which would if polymerized to yield a homopolymer having a weight average molecular weight of 50,000 or greater form such a homopolymer with a measured Tg (DSC) of −20 to −150° C.; and, (iii) one or more vinyl or acrylic comonomers.

6. The two-component instant-set aqueous coating composition as claimed in claim 1, wherein Component I further contains one or more inorganic pigments, fillers or extenders.

7. The two-component instant-set aqueous coating composition as claimed in claim 1, wherein the aqueous polymer composition in the polycation tolerant Component II comprises a film-forming aqueous polymer composition wherein the polymer has a measured Tg of from −50 to 60° C., wherein the measured Tg is determined by differential scanning calorimetry (DSC) in accordance with ASTM E-1356-08 (2014) and the given homopolymer or copolymer was dried for 24 hours and was then conditioned for at least 12 hours at 60° C., and then cooled to a temperature of −70° C. before scanning from −70° C. to 130° C. with a ramp rate of 10°/minute, and reporting the measured Tg as the inflection point of the curve of heat flow vs. temperature or the maximum value on the plot of its derivative.

8. The two-component instant-set aqueous coating composition as claimed in claim 7, wherein the aqueous polymer composition in the polycation tolerant Component II comprises an aqueous emulsion polymer of (ii) one or more soft monomers which would if polymerized to yield a homopolymer having a weight average molecular weight of 50,000 or greater form such a homopolymer with a measured Tg (DSC) of −20 to −150° C.; and (iii) one or more vinyl or acrylic comonomers.

9. The two-component instant-set aqueous coating composition as claimed in claim 1, wherein the polycation in the Component II comprises a polycationic polymer or a multivalent metal salt.

10. The two-component instant-set aqueous coating composition as claimed in claim 9, wherein the polycation in Component II is chosen from a polyfunctional polyamine, a divalent metal chloride or a trivalent metal chloride.

11. A method of making an instant-set coating from the two-component aqueous coating composition of claim 1 comprising:

separately applying streams of each of Component I and Component II to a substrate so as to mix the streams of Components I and II with one another in the air or so as to mix the streams of Component I and Component II at the surface of the substrate as the two-component composition is applied.

* * * * *